US007785383B2

(12) United States Patent
Oh et al.

(10) Patent No.: US 7,785,383 B2
(45) Date of Patent: Aug. 31, 2010

(54) MULTI-CYCLONE DUST SEPARATING APPARATUS AND CLEANER HAVING THE SAME

(75) Inventors: Jang-keun Oh, Gwangju (KR); Min-ha Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 239 days.

(21) Appl. No.: 12/157,914

(22) Filed: Jun. 13, 2008

(65) Prior Publication Data

US 2009/0193772 A1 Aug. 6, 2009

Related U.S. Application Data

(60) Provisional application No. 61/063,066, filed on Jan. 31, 2008.

(30) Foreign Application Priority Data

Mar. 17, 2008 (KR) ..................... 10-2008-0024645

(51) Int. Cl.
*B01D 45/00* (2006.01)

(52) U.S. Cl. ............................ 55/343; 55/345; 55/346; 55/424; 55/447; 55/456; 55/DIG. 3; 15/352; 15/353

(58) Field of Classification Search .................. 55/337, 55/345, 343, 346, 424, 447, 456; 15/352, 15/353

See application file for complete search history.

(56) References Cited

U.S. PATENT DOCUMENTS

| | | | | |
|---|---|---|---|---|
| 6,502,278 | B2 * | 1/2003 | Oh et al. | 15/353 |
| 7,294,159 | B2 * | 11/2007 | Oh et al. | 55/343 |
| 7,462,212 | B2 * | 12/2008 | Han et al. | 55/343 |
| 7,470,299 | B2 * | 12/2008 | Han et al. | 55/345 |
| 7,473,289 | B2 * | 1/2009 | Oh et al. | 55/318 |
| 7,534,279 | B2 * | 5/2009 | Oh et al. | 55/343 |
| 7,537,625 | B2 * | 5/2009 | Han et al. | 55/343 |
| 7,635,400 | B2 * | 12/2009 | Yoo | 55/345 |
| 7,655,058 | B2 * | 2/2010 | Smith | 55/349 |
| 7,662,201 | B2 * | 2/2010 | Lee | 55/419 |
| 2006/0278081 | A1 * | 12/2006 | Han et al. | 96/61 |

FOREIGN PATENT DOCUMENTS

| | | |
|---|---|---|
| GB | 2426473 | 11/2006 |
| KR | 1020020078798 | 10/2002 |
| KR | 1020060031000 | 4/2006 |
| KR | 1020060031443 | 4/2006 |

* cited by examiner

*Primary Examiner*—Jason M Greene
*Assistant Examiner*—Dung Bui
(74) *Attorney, Agent, or Firm*—Ohlandt, Greeley, Ruggiero & Perle, LLP

(57) ABSTRACT

A compact multi-cyclone dust separating is disclosed. The multi-cyclone dust separating apparatus includes a first cyclone chamber that separates dust-laden air drawn from outside, a second cyclone chamber that is disposed in the first cyclone chamber, and that separates dust-laden air drawn from the first cyclone chamber, and a third cyclone chamber that is disposed around a periphery of the first cyclone chamber, and that separates dust-laden air drawn from the second cyclone chamber.

20 Claims, 7 Drawing Sheets

200'

MULTI-CYCLONE DUST SEPARATING APPARATUS AND CLEANER HAVING THE SAME

CROSS-REFERENCE TO RELATED APPLICATIONS

This application claims priority from U.S. Provisional Patent Application No. 61/063,066, filed on Jan. 31, 2008, in the United States Patent and Trademark Office, and from Korean Patent Application No. 10-2008-0024645, filed on Mar. 17, 2008, in the Korean Intellectual Property Office, the disclosure of both which are incorporated herein by reference in their entirety.

BACKGROUND OF THE INVENTION

1. Field of the Invention

The present disclosure relates to a multi-cyclone dust separating apparatus, and more particularly to a compact multi-cyclone dust separating apparatus, and a cleaner having the same.

2. Description of the Related Art

Generally, a cyclone dust separating apparatus causes drawn-in air to whirl therein and separates dirt from the drawn-in air using a centrifugal force. Recently, such cyclone dust separating apparatuses have been widely used in vacuum cleaners. As a conventional cleaner uses a filter to separate the dust from air, a user may experience inconvenience when changing the filter after using the cleaner for more than a predetermined time period. However, a cleaner having a cyclone dust separating apparatus does not need a filter, so it is more convenient for a user to maintain and repair the cleaner.

Cleaners having cyclone-dust separating apparatuses have been developed to increase dust separating efficiency. A multi-cyclone dust separating apparatus is provided as an example to increase dust separating efficiency. The multi-cyclone dust separating apparatus includes a plurality of cyclone chambers to separate dust-laden air in multiple stages. However, a multi-cyclone dust separating apparatus having a plurality of cyclone chambers is increased in volume, and thus the size of a cleaner is increased. Furthermore, air passages in the multi-cyclone dust separating apparatus are complex.

SUMMARY OF THE INVENTION

Exemplary embodiments of the present disclosure address at least the above problems and/or disadvantages and other disadvantages not described above. Also, the present disclosure is not required to overcome the disadvantages described above, and an exemplary embodiment of the present disclosure may not overcome any of the problems described above.

The present disclosure provides a multi-cyclone dust separating apparatus implemented with a compact size and simple air passage.

The present disclosure also provides a cleaner formed in a compact size even when including a multi-cyclone dust separating apparatus.

According to an exemplary aspect of the present disclosure, there is provided a multi-cyclone dust separating apparatus, including a first cyclone chamber that separates dust-laden air drawn from outside; a second cyclone chamber that is disposed in the first cyclone chamber, and that separates dust-laden air drawn from the first cyclone chamber; and a third cyclone chamber that is disposed around a periphery of the first cyclone chamber, and that separates dust-laden air drawn from the second cyclone chamber.

The second cyclone chamber may be smaller than the first cyclone chamber, and the third cyclone chamber may be smaller than the second cyclone chamber.

The apparatus may further include a re-scattering prevention cover that prevents the dust from being re-scattered to the first cyclone chamber, wherein the re-scattering prevention cover is integrally formed with the second cyclone chamber.

The re-scattering prevention cover may include a plurality of holes.

The second cyclone chamber may include a plurality of inlets connected to the first cyclone chamber.

A plurality of third cyclone chambers may be radially disposed around the periphery of the first cyclone chamber.

The second cyclone chamber may include a plurality of chambers.

The first cyclone chamber may include a plurality of chambers, and the second cyclone chamber may be disposed inside the first cyclone chamber.

A plurality of third cyclone chambers may be radially disposed around the periphery of the first cyclone chamber.

The apparatus may further include a first dust receptacle that stores dust separated by the first cyclone chamber; a second dust receptacle that stores dust separated by the second cyclone chamber; and a third dust receptacle that stores dust separated by the third cyclone chamber.

According to another exemplary aspect of the present disclosure, there is provided a cleaner, including a suction brush to draw-in dust-laden air from a surface being cleaned; and a multi-cyclone dust separating apparatus to separate the drawn-in dust-laden air using a centrifugal force, wherein the multi-cyclone dust separating apparatus includes a first cyclone chamber that separates dust-laden air drawn from outside; a second cyclone chamber that is disposed in the first cyclone chamber, and that separates dust-laden air drawn from the first cyclone chamber; and a third cyclone chamber that is disposed around a periphery of the first cyclone chamber, and that separates dust-laden air drawn from the second cyclone chamber.

The second cyclone chamber may be smaller than the first cyclone chamber, and the third cyclone chamber may be smaller than the second cyclone chamber.

The cleaner may further include a re-scattering prevention cover that prevents the dust from being re-scattered to the first cyclone chamber, wherein the re-scattering prevention cover is integrally formed with the second cyclone chamber.

The re-scattering prevention cover may include a plurality of holes.

The second cyclone chamber may include a plurality of inlets connected to the first cyclone chamber.

A plurality of third cyclone chambers may be radially disposed around the periphery of the first cyclone chamber.

The second cyclone chamber may include a plurality of chambers.

The first cyclone chamber may include a plurality of chambers, and the second cyclone chamber may be disposed inside the first cyclone chamber.

A plurality of third cyclone chambers may be radially disposed around the periphery of the first cyclone chamber.

The apparatus may further include a first dust receptacle that stores dust separated by the first cyclone chamber; a second dust receptacle that stores dust separated by the second cyclone chamber; and a third dust receptacle that stores dust separated by the third cyclone chamber.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF THE INVENTION

Figure 1:
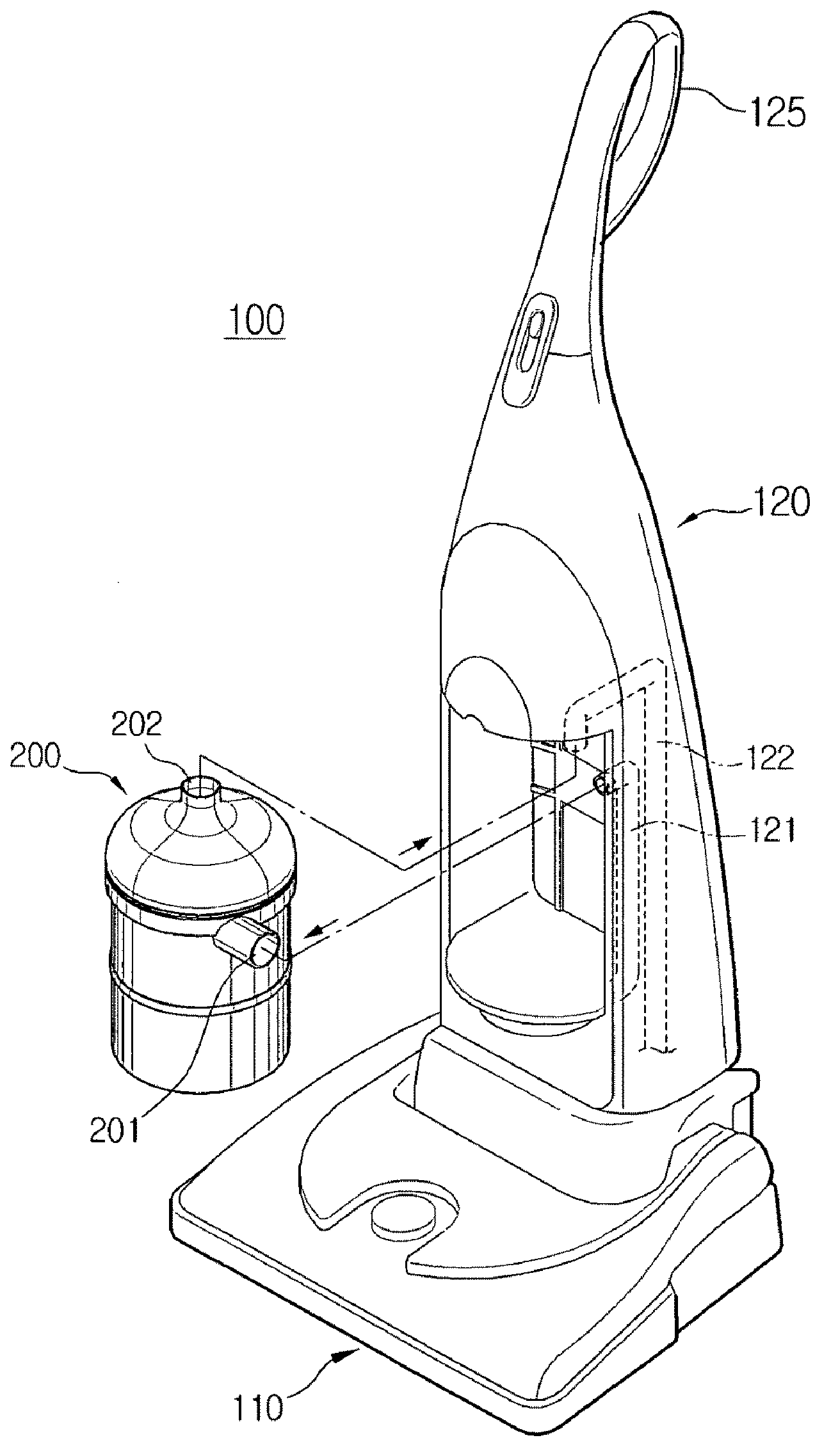
FIG. 1 is a perspective view illustrating a cleaner according to an exemplary embodiment of the present disclosure.

Certain exemplary embodiments of the present disclosure will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the disclosure. Thus, it is apparent that the present disclosure can be carried out without those specifically defined matters. Also, well-known functions or constructions are not described in detail since they would obscure the disclosure with unnecessary detail.

Figure 2:
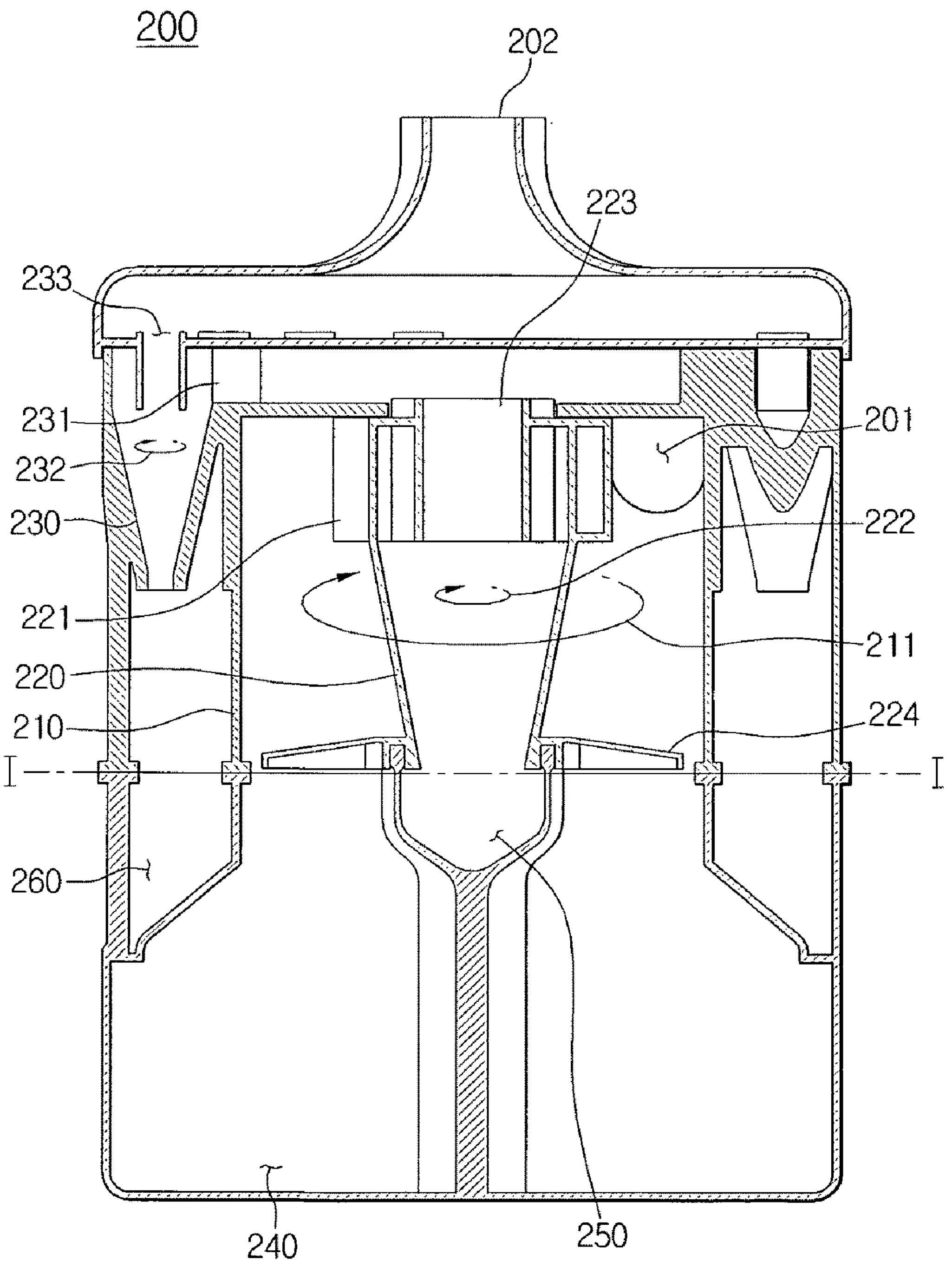
FIG. 2 is a sectional view illustrating a multi-cyclone dust separating apparatus according to an exemplary embodiment of the present disclosure.
Figure 3:
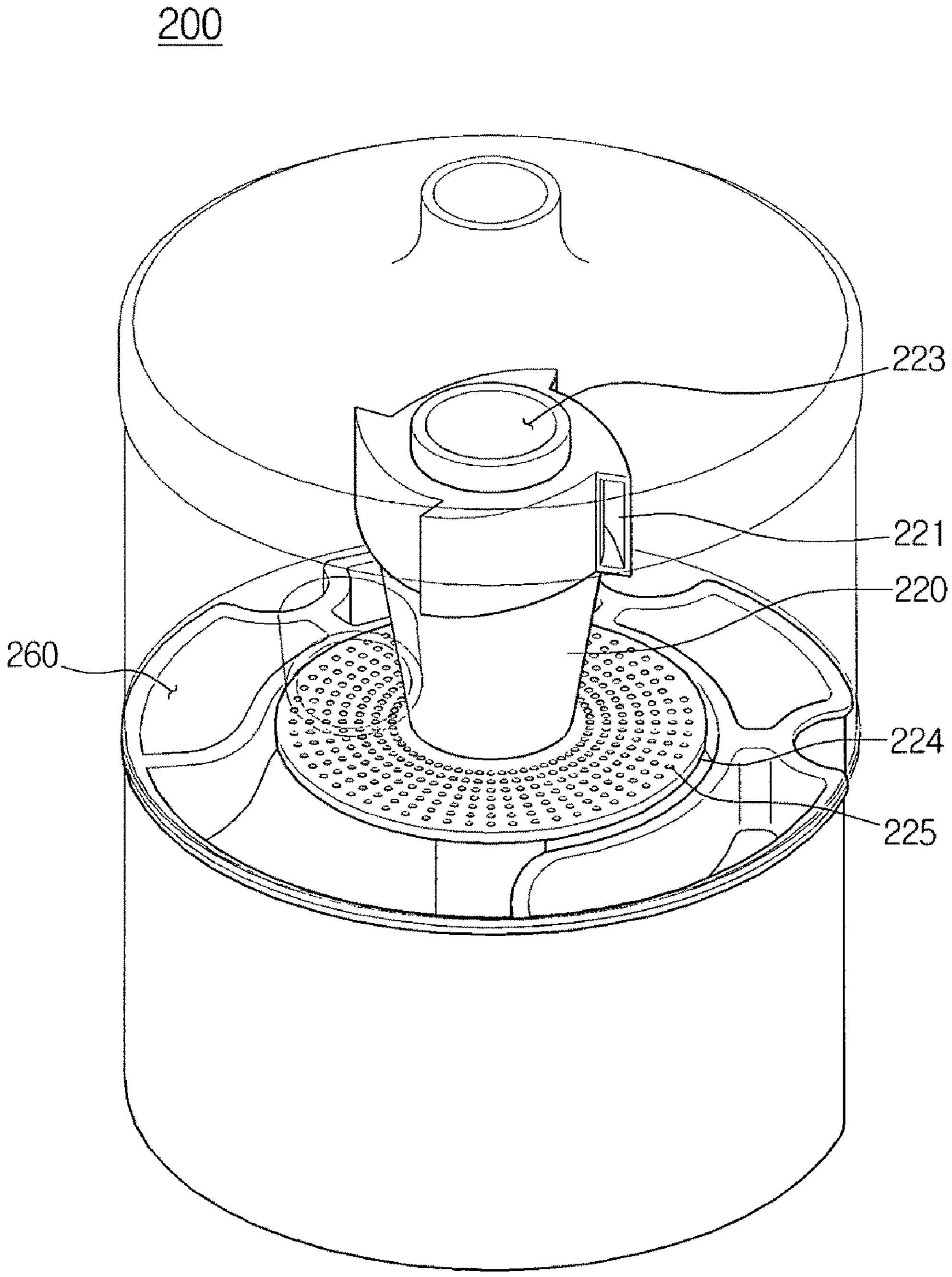
FIG. 3 is a perspective view illustrating a second cyclone chamber in the multi-cyclone dust separating apparatus of FIG. 2.
Figure 4:
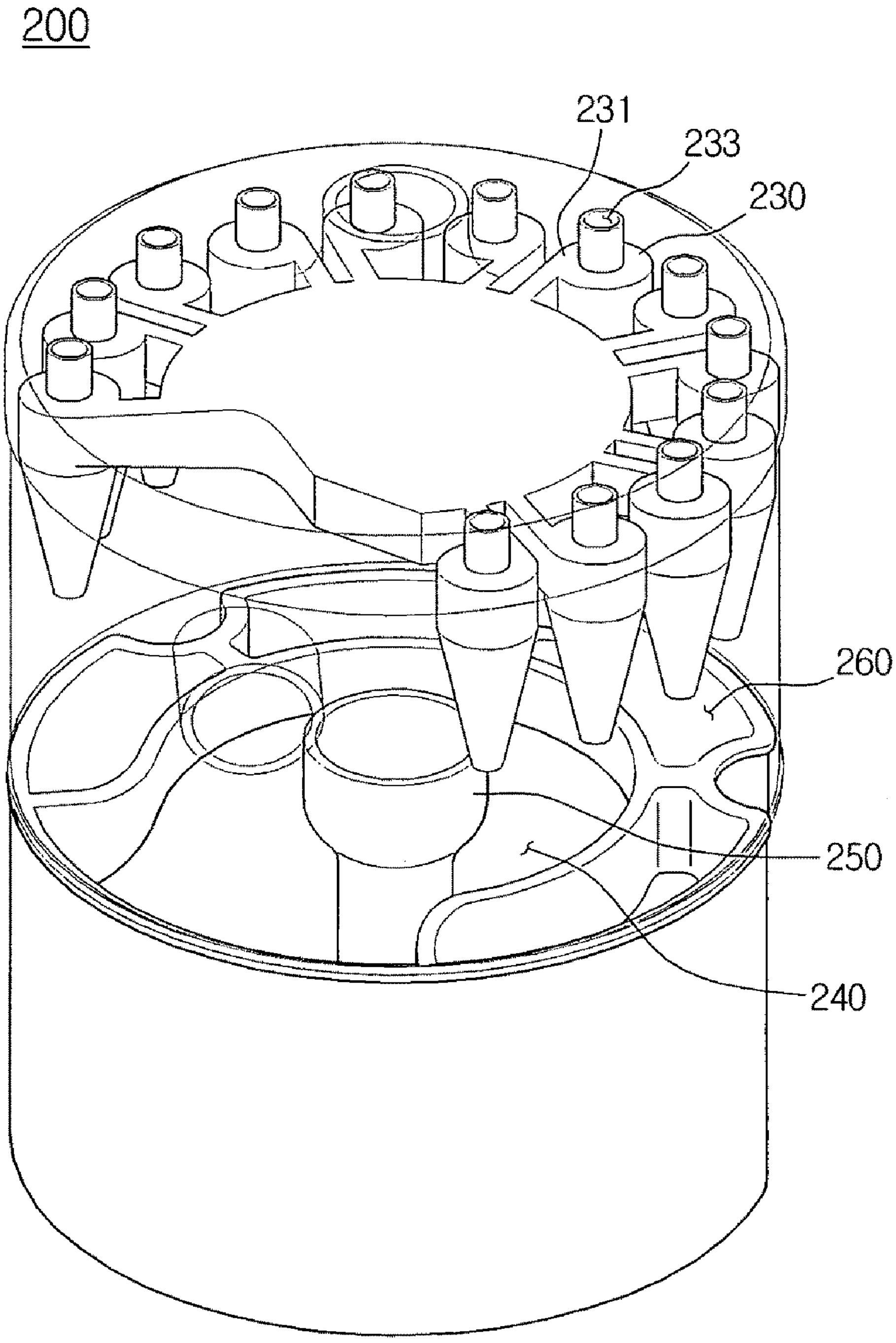
FIG. 4 is a perspective view illustrating a third cyclone chamber in the multi-cyclone dust separating apparatus of FIG. 2.

FIG. 1 is a perspective view illustrating a cleaner according to an exemplary embodiment of the present disclosure, FIG. 2 is a sectional view illustrating a multi-cyclone dust separating apparatus according to an exemplary embodiment of the present disclosure, FIG. 3 is a perspective view illustrating a second cyclone chamber in the multi-cyclone dust separating apparatus of FIG. 2, and FIG. 4 is a perspective view illustrating a third cyclone chamber in the multi-cyclone dust separating apparatus of FIG. 2.

Referring to FIG. 1, a cleaner 100 according to an exemplary embodiment of the present disclosure includes a suction brush 110, a cleaner body 120, and a multi-cyclone dust separating apparatus 200.

The suction brush 110 draws in dust-laden air from a surface being cleaned. The cleaner 100 according to the exemplary embodiment of the present disclosure is an upright type in which the suction brush 110 is formed with the cleaner body 120 as a single body. However, the cleaner 100 may also be implemented as a canister type in which the suction brush 110 is formed separately from the cleaner body 120.

The cleaner body 120 houses therein the multi-cyclone dust separating apparatus 200 and a motor (not shown) to generate a suction force. The dust-laden air drawn-in by the suction brush 110 is drawn into the multi-cyclone dust separating apparatus 200 through a suction pipe 121 in the cleaner body 120. Air from which dust has been separated in the multi-cyclone dust separating apparatus 200 is discharged outside the cleaner 100 through an air discharge pipe 122 in the cleaner body 120. The cleaner body 120 includes a handle 125, which a user grasps in order to clean a surface being cleaned.

The multi-cyclone dust separating apparatus 200 separates dust-laden air flowing therein by a centrifugal force. An inlet 201 formed in the multi-cyclone dust separating apparatus 200 is connected to the suction pipe 121, and thus the dust-laden air drawn-in by the suction brush 110 is drawn into the multi-cyclone dust separating apparatus 200. An outlet 202 formed on the multi-cyclone dust separating apparatus 200 is connected to the air discharge pipe 122, and thus air separating the dust is discharged to the air discharge pipe 122. Referring to FIGS. 2, 3, and 4, the multi-cyclone dust separating apparatus 200 includes a first cyclone chamber 210, a second cyclone chamber 220, a third cyclone chamber 230, a first dust receptacle 240, a second dust receptacle 250, and a third dust receptacle 260.

The first cyclone chamber 210 filters for a first time dust from dust-laden air entering through the inlet 201. Referring to FIG. 2, as the inlet 201 is offset from the center of the first cyclone chamber 210, a whirling air current is generated in the first cyclone chamber 210 in a direction indicated by arrow 211. Large particles of the dust entering the inlet 201 collide with a wall of the first cyclone chamber 210 by the centrifugal force, and are drawn into the first dust receptacle 240 along the wall of the first cyclone chamber 210. As doing so, the large particles of the dust are primarily filtered out in the first cyclone chamber 210. Dust-laden air from which large particles of dust have been filtered enters into the second cyclone chamber 220.

The second cyclone chamber 220 filters dust from the air for the second time after the air has been passed through the first cyclone chamber 210. The second cyclone chamber 220 is smaller than the first cyclone chamber 210, and disposed in the first cyclone chamber 210. Accordingly, the multi-cyclone dust separating apparatus 200 is implemented in a compact size without the volume or size of the apparatus increasing.

The second cyclone chamber 220 includes a plurality of first inlets 221 connected to the first cyclone chamber 210 as shown in FIG. 3. The dust-laden air filtered out by the first cyclone chamber 210 is drawn into the second cyclone chamber 220 through the first inlets 221. The first cyclone chamber 210 is connected directly to the second cyclone chamber 220 through the plurality of first inlets 221, so a large pressure drop is prevented and a complexity of air passages is minimized.

Air drawn into the second cyclone chamber 220 forms an air current that whirls in a direction indicated by arrow 222. The small particles of dust are made to collide with a wall of the second cyclone chamber 220 by the centrifugal force, and are drawn into the second dust receptacle 250 along the wall of the second cyclone chamber 220. The air from which the small particles of dust have been filtered by the second cyclone chamber 220 is discharged through a first outlet 223, and enters the third cyclone chamber 230.

A re-scattering prevention cover 224 is integrally formed in the second cyclone chamber 210 as shown in FIGS. 2 and 3. The re-scattering prevention cover 224 prevents the dust in the first dust receptacle 240 from being re-scattered. Specifically, the whirling air current generated in the first cyclone chamber keeps being generated in the first dust receptacle 240, and thus the dust in the first dust receptacle 240 may rise with an ascending air current. The re-scattering prevention cover 224 blocks the rising dust.

A plurality of holes 225 are formed on the re-scattering prevention cover 224. Particles of dust smaller than the holes 225 pass through the holes 225, but hair and other longer materials cannot pass through the holes 225. Without re-scattering prevention cover 224, hair can become tangled, and clog the passage of the multi-cyclone dust separating apparatus 200 causing the cleaner to operate abnormally. However, the re-scattering prevention cover 224 having the plurality of holes 225 prevents hair from being drawn into the first cyclone chamber 210. Small particles of dust passing through the holes 225 of the re-scattering prevention cover 224 are filtered out by the second and third cyclone chambers 220 and 230.

The third cyclone chamber 230 filters air that has passed through the second cyclone chamber 220 for the third time, and separates fine particles of dust. The third cyclone chamber 230 is smaller than the second cyclone chamber 220, and is disposed around the periphery of the first cyclone chamber 210. Due to the small size of the third chamber 230, the multi-cyclone dust separating apparatus 220 may be made compact even if the third cyclone chamber 230 is disposed outside the first cyclone chamber 210. A plurality of third cyclone chambers 230 may be provided, and may be disposed radially outside the first cyclone chamber 210.

Air flowing into the third cyclone chamber 230 through the second inlet 231 forms an air current that whirls in a direction indicated by arrow 232. Fine particles of dust are made to collide with a wall of the third cyclone chamber 230 by the centrifugal force, and are drawn into the third dust receptacle 260 along the wall of the third cyclone chamber 230. Air from which fine particles of the dust have been filtered by the third cyclone chamber 230 is discharged through a second outlet 233. Air is filtered in three steps, and finally flows toward the outlet 202, and is discharged from the cleaner 100 through the air discharge pipe 122.

The first dust receptacle 240 is placed under the first cyclone chamber 210, and stores dust filtered by the first cyclone chamber 210.

The second dust receptacle 250 is placed under the second cyclone chamber 220, and stores dust filtered by the second cyclone chamber 220.

The third dust receptacle 260 is placed under the third cyclone chamber 230, and stores dust filtered by the third cyclone chamber 230.

The first, second, and third dust receptacles 240, 250 and 260 are formed as a single body, and the multi-cyclone dust separating apparatus 200 may be separated along line I-I of FIG. 2. When the first, second, and third dust receptacles 240, 250 and 260 become filled with dust, a user may detach the multi-cyclone dust separating apparatus 200 from the cleaner body 120, and separates the multi-cyclone dust separating apparatus 200 along line I-I of FIG. 2 in order to empty the dust stored in the first, second and third dust receptacles 240, 250 and 260.

The operation of the multi-cyclone dust separating apparatus 200 according to an exemplary embodiment of the present disclosure will be explained below.

The dust-laden air drawn-in by the suction brush 110 is drawn into the first cyclone chamber 210 through the suction pipe 121 and the inlet 201. Large particles of dust are primarily filtered out using the centrifugal force by the whirling air current formed in the first cyclone chamber 210. The large particles of dust are stored in the first dust receptacle 240. The re-scattering prevention cover 224 integrally formed with the second cyclone chamber 220 prevents the dust stored in the first dust receptacle 240 from flowing back out of the first dust receptacle. The dust-laden air having the large particles of the dust separated therefrom in the first cyclone chamber 210 flows into the second cyclone chamber 220. The small particles of dust are filtered out by the centrifugal force formed by the whirling air current formed in the second cyclone chamber 220 for the second time. The small particles of dust are stored in the second dust receptacle 250. The air from which the small particles of dust have been separated in the second cyclone chamber 220 flows into the third cyclone chamber 230. Fine particles of dust are filtered out in a tertiary filtering step by the centrifugal force formed by the whirling air current formed in the third cyclone chamber 230. The fine particles of dust are stored in the third dust receptacle 260.

FIGS. 5A to 5D illustrate various arrangements of the first, second, and third cyclone chambers 210, 220, and 230.

Figure 5A:
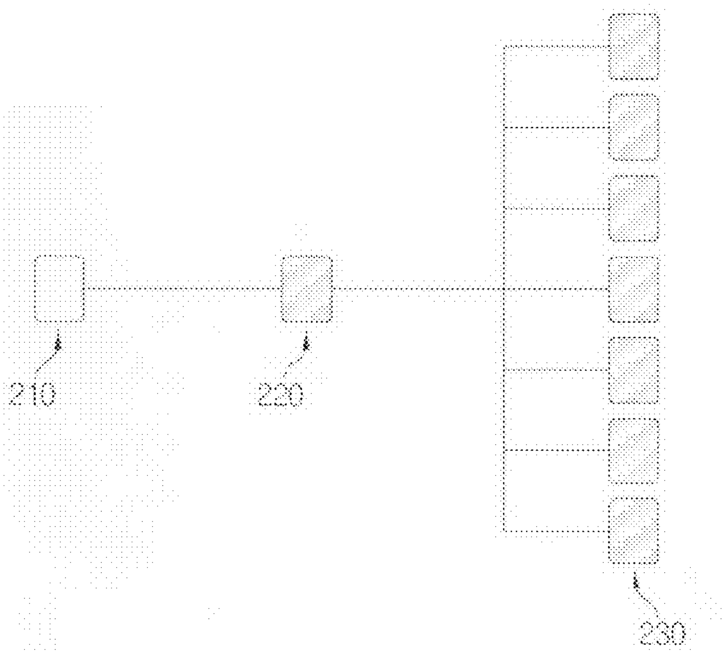
FIGS. 5A to 5D are schematic views in which the first, second, and third cyclone chambers are arranged differently in the multi-cyclone dust separating apparatus of FIG. 2.

The multi-cyclone dust separating apparatus 200 according to an exemplary embodiment of the present disclosure illustrated in FIG. 5A includes one first cyclone chamber 210, one second cyclone chamber 220, and a plurality of third cyclone chambers 230.

Figure 5B:
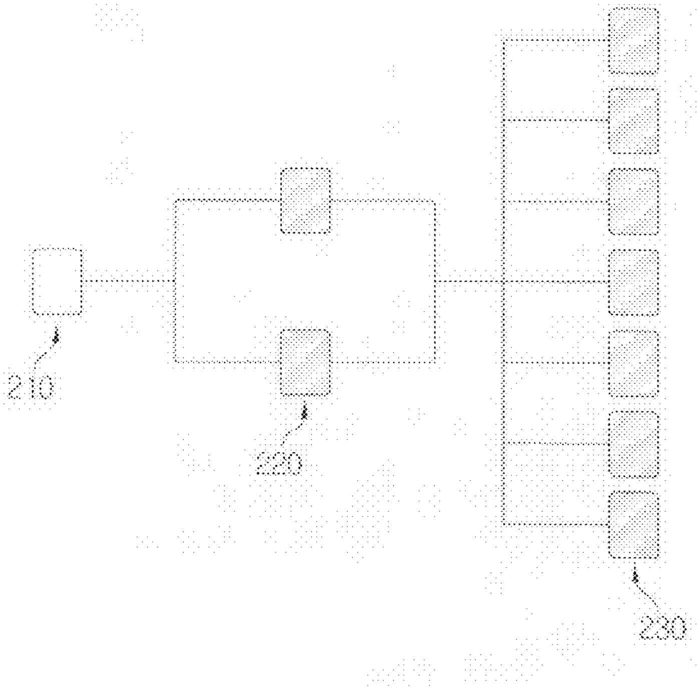

The multi-cyclone dust separating apparatus 200 according to an exemplary embodiment of the present disclosure illustrated in FIG. 5B includes one first cyclone chamber 210, two second cyclone chambers 220, and a plurality of third cyclone chambers 230. The two second cyclone chambers 220 are disposed inside the first cyclone chamber 210, and the plurality of third cyclone chambers 230 are disposed around the outer block of the first cyclone chamber 210, so the multi-cyclone dust separating apparatus 200 is compactly designed.

Figure 5C:
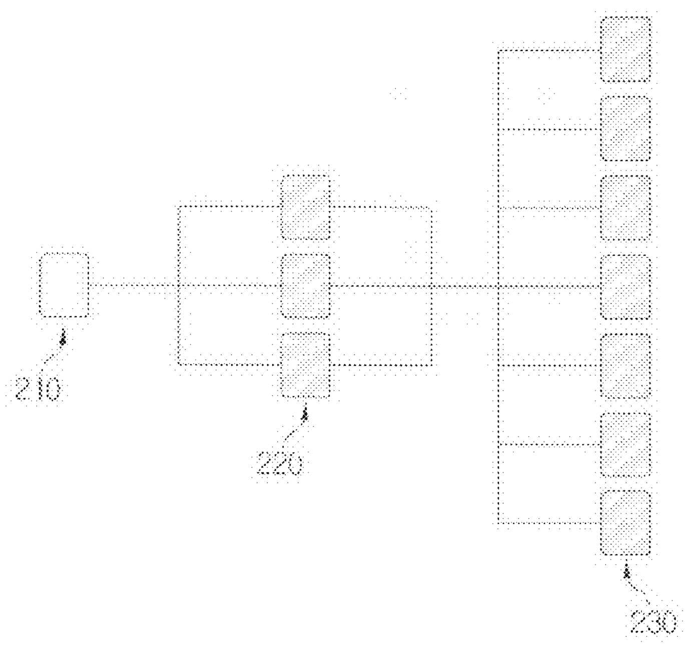

The multi-cyclone dust separating apparatus 200 according to an exemplary embodiment of the present disclosure illustrated in FIG. 5C includes one first cyclone chamber 210, three second cyclone chambers 220, and a plurality of third cyclone chambers 230. The three second cyclone chambers are disposed inside the first cyclone chamber 210, and the plurality of third cyclone chambers 230 are disposed around the outer block of the first cyclone chamber 210, so the multi-cyclone dust separating apparatus 200 is compactly designed.

Figure 5D:
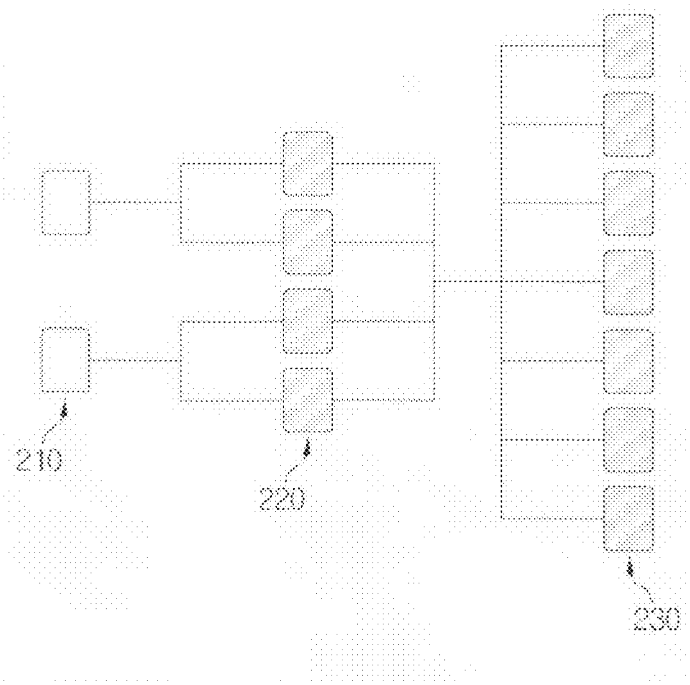

The multi-cyclone dust separating apparatus 200 according to an exemplary embodiment of the present disclosure illustrated in FIG. 5D includes two first cyclone chambers 210, four second cyclone chambers 220, and a plurality of third cyclone chambers 230. Each of the first cyclone chambers 210 includes therein two second cyclone chambers 220, so two first cyclone chambers 210 and four second cyclone chambers 220 are provided, and the plurality of third cyclone chambers 230 are placed around the outer block of the first cyclone chamber 210. In doing so, even when the two first cyclone chambers 210 are used, the multi-cyclone dust separating apparatus 200 is implemented in a compact size.

Figure 6:
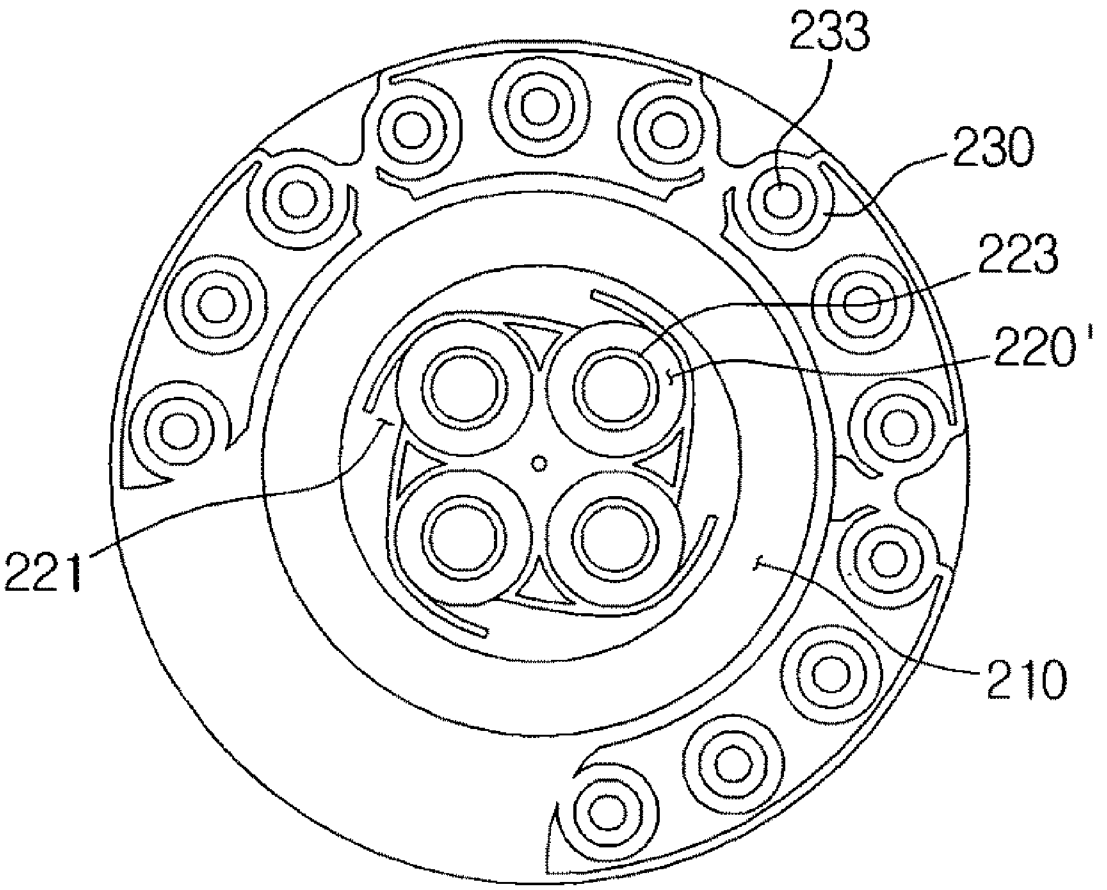
FIG. 6 is a top view illustrating a multi-cyclone dust separating apparatus according to an alternate exemplary embodiment of the present disclosure.

FIG. 6 is a sectional view illustrating a multi-cyclone dust separating apparatus according to an exemplary embodiment of the present disclosure. The second cyclone chamber 220' in FIG. 6 is distinct from that of the multi-cyclone dust separating apparatus 200 in FIG. 2, in that there are a plurality of second cyclone chambers 220', whereas the other features are similar each other. Specifically, four second cyclone chambers 220' are provided, and each of the second cyclone chambers 220' is connected to the first cyclone chamber 210 through the inlet 221.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A multi-cyclone dust separating apparatus, comprising:

a first cyclone chamber that separates dust-laden air drawn from outside;

a second cyclone chamber that is disposed in the first cyclone chamber, and that separates dust-laden air drawn from the first cyclone chamber; and a third cyclone chamber that is disposed around a periphery of the first cyclone chamber, and that separates dust-laden air drawn from the second cyclone chamber.

2. The apparatus of claim 1, wherein the second cyclone chamber is smaller than the first cyclone chamber, and the third cyclone chamber is smaller than the second cyclone chamber.

3. The apparatus of claim 2, further comprising:

a re-scattering prevention cover that prevents the dust from being re-scattered from the first cyclone chamber, wherein the re-scattering prevention cover is integrally formed with the second cyclone chamber.

4. The apparatus of claim 3, wherein the re-scattering prevention cover comprises a plurality of holes.

5. The apparatus of claim 2, wherein the second cyclone chamber comprises a plurality of inlets connected to the first cyclone chamber.

6. The apparatus of claim 2, wherein the third cyclone chamber comprises a plurality of third cyclone chambers that are radially disposed around the periphery of the first cyclone chamber.

7. The apparatus of claim 2, wherein the second cyclone chamber comprises a plurality of chambers.

8. The apparatus of claim 2, wherein the first cyclone chamber comprises a plurality of first chambers, and the second cyclone chamber comprises a plurality of second chambers, and wherein at least one of the plurality of second chambers is disposed inside each of the plurality of first chambers.

9. The apparatus of claim 8, wherein the third cyclone chamber comprises a plurality of third chambers that are radially disposed around the periphery of the first cyclone chamber.

10. The apparatus of claim 2, further comprising:

a first dust receptacle that stores dust separated by the first cyclone chamber;

a second dust receptacle that stores dust separated by the second cyclone chamber; and a third dust receptacle that stores dust separated by the third cyclone chamber.

11. A cleaner comprising:

a suction brush to draw-in dust-laden air from a surface being cleaned; and a multi-cyclone dust separating apparatus to separate the drawn-in dust-laden air using a centrifugal force, wherein the multi-cyclone dust separating apparatus comprises:

a first cyclone chamber that separates dust-laden air drawn from outside;

a second cyclone chamber that is disposed in the first cyclone chamber, and that separates dust-laden air drawn from the first cyclone chamber; and a third cyclone chamber that is disposed around a periphery of the first cyclone chamber, and that separates dust-laden air drawn from the second cyclone chamber.

12. The cleaner of claim 11, wherein the second cyclone chamber is smaller than the first cyclone chamber, and the third cyclone chamber is smaller than the second cyclone chamber.

13. The cleaner of claim 12, further comprising:

a re-scattering prevention cover that prevents the dust from being re-scattered from the first cyclone chamber, wherein the re-scattering prevention cover is integrally formed with the second cyclone chamber.

14. The cleaner of claim 13, wherein the re-scattering prevention cover comprises a plurality of holes.

15. The cleaner of claim 12, wherein the second cyclone chamber comprises a plurality of inlets connected to the first cyclone chamber.

16. The apparatus of claim 12, wherein the third cyclone chamber comprises a plurality of third cyclone chambers that are radially disposed around the periphery of the first cyclone chamber.

17. The apparatus of claim 12, wherein the second cyclone chamber comprises a plurality of chambers.

18. The apparatus of claim 12, wherein the first cyclone chamber comprises a plurality of first chambers, and the second cyclone chamber comprises a plurality of second chambers, and wherein at least one of the plurality of second chambers is disposed inside each of the plurality of first chambers.

19. The apparatus of claim 18, wherein the third cyclone chamber comprises a plurality of third chambers that are radially disposed around the periphery of the first cyclone chamber.

20. The apparatus of claim 12, further comprising:

a first dust receptacle that stores dust separated by the first cyclone chamber;

a second dust receptacle that stores dust separated by the second cyclone chamber; and a third dust receptacle that stores dust separated by the third cyclone chamber.

* * * * *